United States Patent
Nakanishi

(10) Patent No.: US 10,579,051 B2
(45) Date of Patent: Mar. 3, 2020

(54) OIL MIST CONCENTRATION MANAGEMENT APPARATUS, OIL MIST MANAGEMENT SYSTEM, AND OIL MIST MANAGEMENT METHOD

(71) Applicant: FANUC CORPORATION, Yamanashi (JP)

(72) Inventor: Daisuke Nakanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/702,512

(22) Filed: Sep. 12, 2017

(65) Prior Publication Data

US 2018/0074480 A1    Mar. 15, 2018

(30) Foreign Application Priority Data

Sep. 12, 2016 (JP) ................................ 2016-177635

(51) Int. Cl.
*G05B 19/418* (2006.01)

(52) U.S. Cl.
CPC ............ *G05B 19/41875* (2013.01); *G05B 2219/49062* (2013.01)

(58) Field of Classification Search
CPC ............ G05B 19/41875; G05B 2219/49062
See application file for complete search history.

(56) References Cited

U.S. PATENT DOCUMENTS

| | | | | |
|---|---|---|---|---|
| 3,587,079 A | * | 6/1971 | Obergefell | G01N 21/534 184/6.4 |
| 7,499,152 B2 | * | 3/2009 | Roders | B23Q 17/2485 356/36 |
| 9,080,975 B2 | * | 7/2015 | Gnauert | G01M 15/042 |
| 2005/0264793 A1 | * | 12/2005 | Roders | B23Q 17/2485 356/36 |
| 2015/0000388 A1 | * | 1/2015 | Gnauert | G01M 15/042 73/114.56 |
| 2016/0089758 A1 | * | 3/2016 | Fujimoto | G05B 19/414 700/180 |
| 2017/0030762 A1 | * | 2/2017 | Kasai | G01F 23/00 |
| 2018/0073563 A1 | * | 3/2018 | Nakanishi | F16C 33/6662 |

FOREIGN PATENT DOCUMENTS

| | | |
|---|---|---|
| CN | 103605320 A | 2/2014 |
| CN | 104044010 A | 9/2014 |
| JP | H6-335839 A | 12/1994 |
| JP | 2002-224932 A | 8/2002 |
| JP | 2002-239323 A | 8/2002 |
| JP | 2012043952 A | 3/2012 |
| JP | 2016064482 A | 4/2016 |

* cited by examiner

Primary Examiner — Charles R Kasenge
(74) Attorney, Agent, or Firm — Hauptman Ham, LLP

(57) ABSTRACT

An oil mist management system includes a plurality of machine tools provided in a factory, and an oil mist concentration measuring apparatus for measuring concentration of oil mist in the factory. Further, a data processing apparatus determines whether the concentration of the oil mist is larger than a threshold value, and if the concentration of the oil mist is larger than the threshold value, the data processing apparatus issues a command to decrease machining speed or stop operation of a machine tool that has the lower priority rank among the machine tools.

10 Claims, 7 Drawing Sheets

FIG. 3

| MACHINE TOOL | MACHINING TIME (h) | NUMBER OF ORDERS RECEIVED (n) | TOTAL MACHINING TIME (h) | PRIORITY RANK |
|---|---|---|---|---|
| A | 1 | 150 | 150 | 2 |
| B | 2 | 50 | 100 | 3 |
| C | 3 | 100 | 300 | 1 |
| D | 4 | 5 | 20 | 6 |
| E | 5 | 15 | 75 | 4 |
| F | 6 | 10 | 60 | 5 |

OIL MIST CONCENTRATION MANAGEMENT APPARATUS, OIL MIST MANAGEMENT SYSTEM, AND OIL MIST MANAGEMENT METHOD

CROSS-REFERENCE TO RELATED APPLICATION

This application is based upon and claims the benefit of priority from Japanese Patent Application No. 2016-177635 filed on Sep. 12, 2016, the contents of which are incorporated herein by reference.

BACKGROUND OF THE INVENTION

Field of the Invention

The present invention relates to an oil mist concentration management apparatus, an oil mist management system, and an oil mist management method for managing a state of oil mist generated in a factory.

Description of the Related Art

Machine tools (metal machining devices) for metal machining are used to blow cutting fluid onto workpieces in machining (cutting), etc. to thereby improve the lubricating performance of the tools, prevent generation of dust, and cool the tools and/or the workpieces, for example. Therefore, oil mist (cutting fluid in the form of mist) is dispersed in the air around the machine tool. Since this oil mist may cause operation failures, e.g., in the drive control of the apparatus, it is desired to eliminate the oil mist as much as possible.

For example, in a machine tool disclosed in Japanese Laid-Open Patent Publication No. 2016-064482, concentration of the oil mist is measured in a control panel of the machine tool, and concentration of the oil mist is adjusted based on the measurement result.

SUMMARY OF THE INVENTION

In a metal machining factory, normally, a plurality of machine tools are provided, and various types of machining are performed by each of the machine tools. Under the circumstances, oil mist generated from one of the machine tools may affect operation of another machine tool. That is, in a factory where a plurality of machine tools are provided, it is desired to recognize and manage the state of oil mist concentration in the entire machining room, and suitably operate the machine tools.

The present invention has been made taking the above circumstances into account, and an object of the present invention is to provide an oil mist concentration management apparatus, an oil mist management system, and an oil mist management method which make it possible to build a desired working environment in a factory where a plurality of machines are provided, by changing operation content of a machine based on recognition of concentration of oil mist.

In order to achieve the above object, an oil mist concentration management apparatus according to the present invention includes a concentration acquisition unit configured to acquire concentration of oil mist measured in a factory in which a plurality of machines are provided, a determination unit configured to determine whether or not the concentration of the oil mist is larger than a threshold value, and a command unit configured to, if the determination unit determines that the concentration of the oil mist is larger than the threshold value, issue a command to change operation content of at least one of the plurality of machines.

In the above structure, based on the concentration of the oil mist acquired by the concentration acquisition unit, the oil mist concentration management apparatus can suitably recognize whether or not concentration of the oil mist in the factory has become high. Further, the oil mist concentration management apparatus can change the state of the concentration of the oil mist in the factory by issuing a command to change the operation content of the machine when the concentration of the oil mist is high. Examples of change of the state of the concentration of the oil mist include decrease of the oil mist, and uniformizing (uniform distribution) of the oil mist in the factory. In this manner, a desired working environment is created in the factory, and consequently, for example, it is possible to expect improvement in the running efficiency of the factory.

In this case, the command unit may issues a command to decrease machining speed of the machine or stop operation of the machine as the operation content.

The oil mist concentration management apparatus issues a command to decrease the machine speed or stop operation of the machine as the operation content. Therefore, it is possible to decrease or eliminate the oil mist scattered from the machine. Thus, the oil mist in the factory is decreased easily.

In addition to the above structure, preferably, the oil mist concentration management apparatus includes a priority rank processing unit configured to determine priority ranks of the plurality of machines, and in the case where the concentration of the oil mist is larger than the threshold value, the command unit issues a command to decrease the machining speed or stop operation, in order from the machine having the lower priority rank, until the concentration of the oil mist becomes less than or equal to the threshold value.

The oil mist concentration management apparatus can easily determine a machine for which its machining speed should be decreased or its operation should be stopped, based on the priority ranks. Further, since the operation contents of the machines are changed until the concentration of the oil mist becomes less than or equal to the threshold value, it is possible to decrease the oil mist in the factory more reliably.

Further, the priority rank processing unit may be configured to calculate the total machining time based on a machining time required for the machine to machine a workpiece, and the number of orders received for the workpiece, and assign the priority ranks to the machines in order from the machine having a longer total machining time.

If the total machining time is long, since there is no sufficient time for the machine to machine the workpiece before the deadline, it is difficult to change the operation content. If the total machining time is short, since there is ample time for the machine to machine the workpiece before the deadline, it is easy to change the operation content. Therefore, the oil mist concentration management apparatus can suppress decrease in the running efficiency in the entire factory, and achieve reduction in the oil mist.

Further, in the case where the concentration of the oil mist is larger than the threshold value, the command unit may issue a command to operate an oil mist remover provided beforehand in the factory before issuing a command to decrease the machining speed or stop operation of the machine, the oil mist remover being configured to remove the oil mist.

The oil mist concentration management apparatus can operate the oil mist remover before decreasing the machining speed of the machine or stopping operation of the machine to thereby suppress easily changing of the operation content of the machine. Further, the oil mist remover can achieve reduction of the oil mist.

Alternatively, the oil mist concentration management apparatus may be configured to manage state of the oil mist in a plurality of areas where the plurality of machines are provided, respectively, on an area-by-area basis, and if the concentration of the oil mist is larger than the threshold value in a certain area, the command unit may command a machine that is in an area where the machine is not operated, to perform machining, as the operation content.

The oil mist concentration management apparatus can recognize the state of the distribution of the concentration of the oil mist on the area by area basis, to stop machining in the area having the high oil mist concentration. Further, in the area where operation of the machine is not performed, since it is expected that the oil mist concentration is low, by switching to machining by this machine, uniformization of the oil mist in the factory is achieved.

In this respect, preferably, in the case where the concentration of the oil mist is larger than the threshold value in a certain area, the command unit commands a machine that is in an area where the concentration of the oil mist is the lowest, to perform machining.

Further, the oil mist concentration management apparatus commands the machine which is not in operation, and which is in the area having the lowest concentration of the oil mist, to machine the workpiece. In this manner, it is possible to efficiently achieve a uniform distribution of oil mist concentration in the factory.

Further, the command unit may include a machining program determination processing unit, and the machining program determination processing unit may be configured to determine whether or not a machine to be commanded to perform machining has a machining program, and if the machine to be commanded to perform the machining does not have the machining program, transmit the machining program to the machine to be commanded to perform the machining.

In the case where a machine which is to be commanded to perform machining does not have the machining program, the oil mist concentration management apparatus sends the machining program to the machine by the machining program determination processing unit. In this manner, a desired machining can be performed by the machine.

Further, the oil mist concentration management apparatus may include a workpiece transportation apparatus configured to automatically transport a workpiece to the plurality of areas, and the command unit may include a transportation command unit configured to command the workpiece transportation apparatus to transport the workpiece to an area of the machine to be commanded to perform the machining.

Further, in the oil mist concentration management apparatus, by the command of the transportation command unit, the workpiece is transported to an area of the machine which is commanded to machine the workpiece. In this manner, it is possible to perform machining of the workpiece more efficiently.

Further, preferably, the oil mist concentration management apparatus includes a notification processing unit, and when a machine for which the operation content is changed is determined by the command unit, the notification processing unit notifies a user of the machine for which the operation content is changed, and the operation content.

The notification processing unit of the oil mist concentration management apparatus notifies the user of the machine for which the operation content is changed, and the operation content. In this manner, the user can suitably recognize the management of operation of the machine.

Further, in order to achieve the above object, an oil mist management system according to the present invention includes a plurality of machines provided in a factory, a concentration measuring apparatus configured to measure concentration of oil mist in the factory, and an oil mist concentration management apparatus configured to determine whether or not the concentration of the oil mist is larger than a threshold value, and if the concentration of the oil mist is larger than the threshold value, the oil mist concentration management apparatus is configured to issue a command to change operation content of at least one of the plurality of machines.

Further, in order to achieve the above object, an oil mist management method of managing oil mist in a factory where a plurality of machines are provided, by an oil mist concentration management apparatus, is provided. The method includes a measurement data acquisition step of acquiring concentration of the oil mist in the factory, a determination step of determining whether or not the acquired concentration of the oil mist is larger than a threshold value, and a command step of, in the case where it is determined that the concentration of the oil mist is larger than the threshold value in the determination step, issuing a command to change operation content of at least one of the plurality of machines.

According to the present invention, in the oil mist concentration management apparatus, the oil mist management system, and the oil mist management method, in the factory where a plurality of machines are provided, by changing the operation content of the machine based on the recognition of the concentration of the oil mist, it is possible to build a suitable working environment.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table showing a manner of determining priority ranks by a data processing apparatus in FIG. 1;

DESCRIPTION OF THE PREFERRED EMBODIMENTS

Hereinafter, preferred embodiments of an oil mist concentration management apparatus, an oil mist management system, and an oil mist management method will be described in detail with reference to the accompanying drawings.

[First Embodiment]

Figure 1:
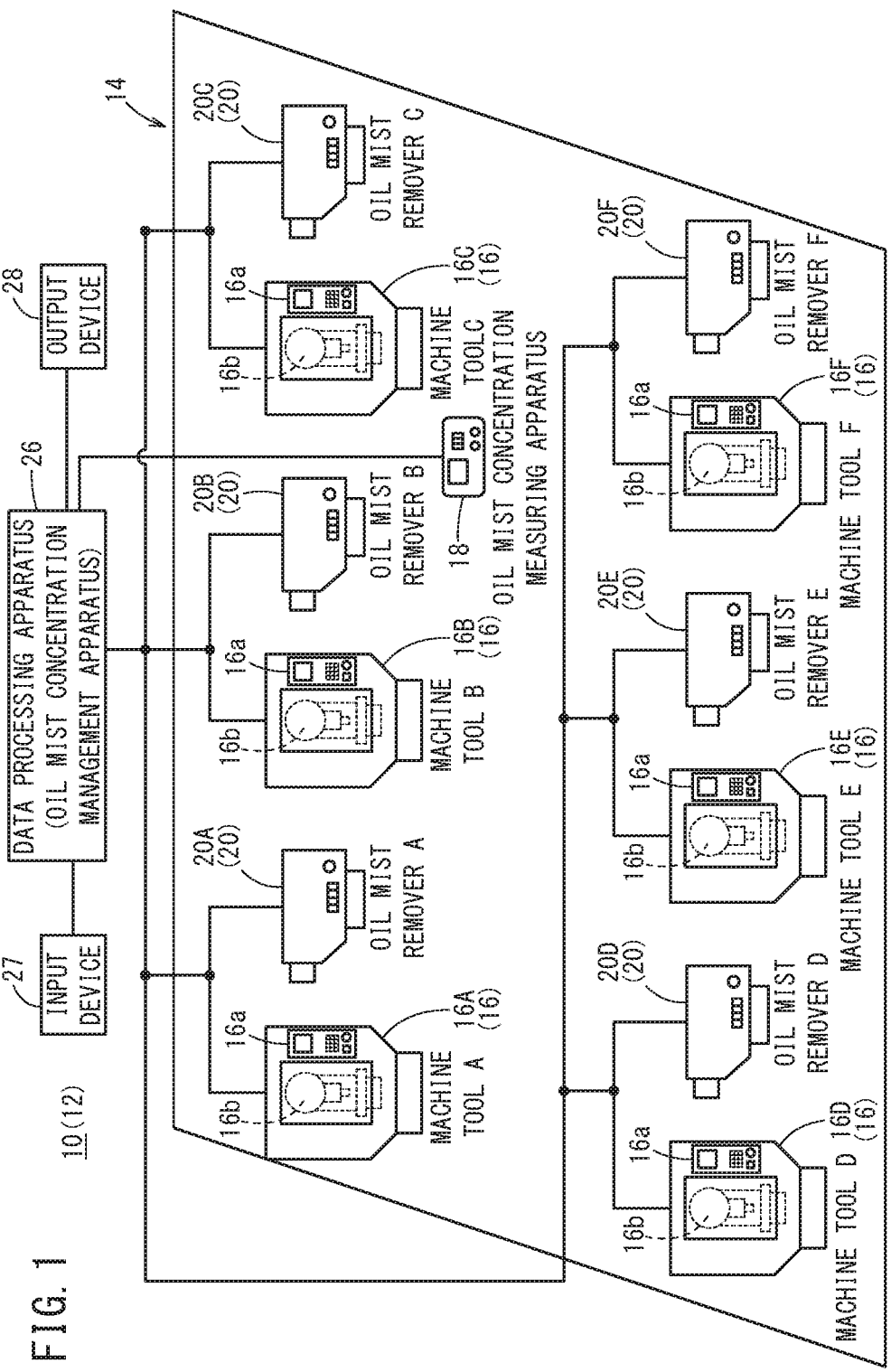
FIG. 1 is a diagram schematically showing overall structure of an oil mist management system according to a first embodiment of the present invention.

As shown in FIG. 1, an oil mist management system 10 according to a first embodiment of the present invention is provided in a metal machining factory 12 (hereinafter also simply referred to as the factory 12), and monitors the state of oil mist floating in a machining room 14 in the factory 12. In particular, the oil mist management system 10 recognizes the state of oil mist in the machining room 14, and the state of the machine tools, to control the running state of the machine tools.

In the machining room 14 of the factory 12, for example, a plurality of (six in FIG. 1) machine tools (machines) 16 (metal machining devices) are provided. Under control of a control device 16a, the machine tools 16 cut metal material into workpieces having predetermined shapes. As described above, at the time of cut machining, the cutting fluid, etc. used by the machine tools 16 is dispersed into oil mist, and the oil mist floats in the machining room 14. The oil mist management system 10 monitors the oil mist generated from the plurality of machine tools 16 in the entire machining room 14. Hereinafter, for ease of explanation, alphabets A to F are assigned to the six machine tools, respectively. Each of these machine tools is referred to as the machine tool 16A, the machine tool 16B, the machine tool 16C, . . . , etc.

The machine tools 16A to 16F may be divided by walls, resin panels, etc. provided in the machining room 14. This is because the oil mist is diffused throughout the machining room 14 through gaps between the walls, the resin panels, etc. Further, the following description is based on the premise that the machine tools (machines) 16A to 16F are of the same type. However, the types of the machines are not limited, as long as the machines perform machining operation under an environment where the oil mist is dispersed.

In the machining room 14, one oil mist concentration measuring apparatus 18 is provided. In the illustrated embodiment, though the oil mist concentration measuring apparatus 18 is provided at substantially the central position of the machining room 14, the layout for installing the oil mist concentration measuring apparatus 18 can be determined arbitrarily. Further, a plurality of oil mist concentration measuring apparatuses 18 may be provided in the machining room 14.

Further, an oil mist remover 20 is provided adjacent to each of the machine tools 16A to 16F. That is, in total, six oil mist removers 20 are provided to remove the oil mist floating around the machine tools 16A to 16F. Alphabets A to F are assigned respectively to the six oil mist removers 20 as well for ease of explanation. It should be noted that the number of the oil mist removers 20 may not be the same as the number of the machine tools 16. For example, one oil mist remover 20 may be positioned between two machine tools 16. That is, it is sufficient to provide at least one oil mist remover 20 in order to remove oil mist in the machining room 14 as necessary. The oil mist remover 20 may not be provided. In this case, an air conditioning system in the machining room 14 may function as the oil mist remover 20.

Further, in the factory 12 (e.g., management room), a data processing apparatus (oil mist concentration management apparatus) 26 is provided. The data processing apparatus 26 performs information communication through communication means such as a LAN among the plurality of machine tools 16A to 16F, the oil mist concentration measuring apparatus 18, and the plurality of oil mist removers 20A to 20F. Further, an input device 27 is connected to the data processing apparatus 26 for allowing a user to interact with the data processing apparatus 26. Examples of the input device 27 include a keyboard and/or a mouse, etc. Further, an output device 28 is connected to the data processing apparatus 26. The output device 28 provides information for a user who manages the factory 12. Examples of the output device 28 include a monitor and/or a speaker, and a notification light provided in each of the areas. It should be noted that the input device 27 and the output device 28 may be in the form of a single entity, such as a touch panel, etc.

Each of the machine tools 16A to 16F is used for machining metal material, and includes the control device 16a described above, and a drive unit 16b for driving a tool by a servo motor or a linear motor. The control device 16a controls operation of a tool (drive unit 16b) based on an internally stored machining program, and forms a workpiece into a predetermined shape.

Further, the oil mist concentration measuring apparatus 18 measures concentration of the oil mist dispersed and floating in the machining room 14, and transmits the measurement data Dm (oil mist concentration: see FIG. 2) to the data processing apparatus 26. According to a possible principle of the oil mist concentration measuring apparatus 18 of this type, for example, air containing the oil mist is introduced thereinto, and the introduced oil mist is electrified, so that the mist is attracted to a piezoelectric element. Based on the resulting frequency change of the piezoelectric element at this time, the concentration is processed into a numeric value. Alternatively, according to another possible principle of the oil mist concentration measuring apparatus 18, a filter (not shown) may be provided, and the weight change of the filter is measured to process the concentration of the oil mist into a numeric value. In still another example, air containing the oil mist is introduced thereinto, and the introduced oil mist is irradiated with a laser in the optical system, so that the laser is scattered. Based on the scattered light, the concentration is processed into a numeric value.

Under control of the data processing apparatus 26, each of the oil mist removers 20 removes the oil mist dispersed from each of the machine tools 16A to 16F. Examples of the oil mist remover 20 of this type includes an oil mist remover which suctions air containing oil mist, and adsorbs and removes the oil mist through a suitable filter. Alternatively, for example, an oil mist remover which generates plasma to collect and remove the oil mist may be adopted.

The data processing apparatus 26 is provided in the form of a control unit which controls operation of the plurality of machine tools 16A to 16F, and the plurality of oil mist removers 20A to 20F, based on the oil mist concentration measured by the oil mist concentration measuring apparatus 18.

For example, a computer made up of a processor, an input/output interface (not shown), and a memory 32 (see FIG. 2) is used as the data processing apparatus 26. Alternatively, a management computer and/or a server which manages the entire factory 12, or a control computer, etc. which monitors the state of the plurality of machine tools 16 in the machining room 14 may be used as the data processing apparatus 26.

Figure 2:
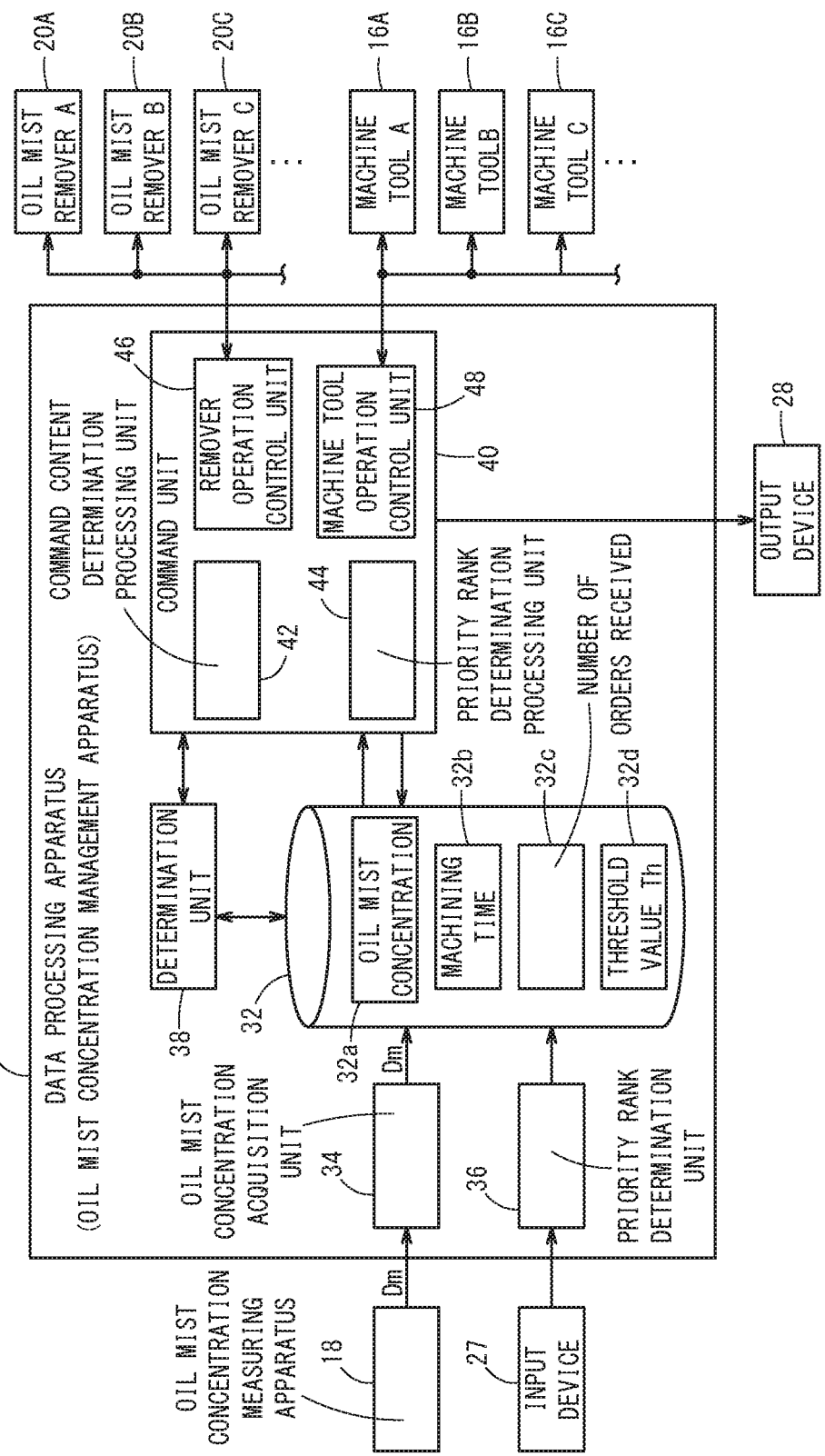
FIG. 2 is a functional block diagram at the time of operating the oil mist management system in FIG. 1.

Further, the data processing apparatus 26 build a software functional unit which monitors the state of the oil mist in the factory 12, by a processor executing a control program (not shown) stored in the memory 32. More specifically, as shown in FIG. 2, an oil mist concentration acquisition unit 34, a priority rank determination unit 36, a determination unit 38, and a command unit 40 are formed.

The oil mist concentration acquisition unit 34 receives measurement data Dm of the oil mist from the oil mist concentration measuring apparatus 18, and stores the measurement data Dm in an oil mist concentration storage area 32a of the memory 32. For example, the oil mist concentration acquisition unit 34 acquires the measurement data Dm by providing a command to the oil mist concentration measuring apparatus 18 at a predetermined time period. At this time, in order to improve the efficiency of processing, the time period may be changed, e.g., by acquiring the oil mist concentration in a short sampling time period when the oil mist concentration is high, and acquiring the oil mist concentration in a long sampling time period when the oil mist concentration is low. Further, the oil mist concentration acquisition unit 34 may automatically obtain measurement data Dm from the oil mist concentration measuring apparatus 18.

The priority rank determination unit 36 receives information (machining time and the number of orders received, to be described below) regarding the priority rank inputted by the user through the input device 27, and stores the information in storage areas (machining time storage area 32b, number-of-orders-received storage area 32c) of the memory 32. At the time of storing the information in the memory 32, a database (see FIG. 3) should be built in which the plurality of machine tools 16A to 16F are associated with the machining time and the number of machining steps. It should be noted that the machining time may be set by the data processing apparatus 26 referring to a machining program of each of the machine tools 16A to 16F. The use of information regarding the priority rank will be described in detail, in relation to operation of the command unit 40.

The determination unit 38 makes a determination about concentration of the oil mist in the machining room 14 stored in the memory 32. More specifically, based on acquisition of the measurement data Dm, the determination unit 38 reads a threshold value Th for determining oil mist concentration stored in a threshold value storage area 32d of the memory 32, and the oil mist concentration stored in the oil mist concentration storage area 32a, and then compares the threshold value Th with the oil mist concentration. The threshold value Th is determined beforehand as an averaged numeric value of the upper limit of the allowable oil mist concentration in the entire machining room 14. For example, $2.0[mg/m^3]$ is determined as the threshold value Th.

If the determination unit 38 determines that the oil mist concentration has become larger than the threshold value Th by comparison, the determination unit 38 sends the determination result (hereinafter referred to as the high concentration determination) to the command unit 40. If the oil mist concentration is smaller than or equal to the threshold valve Th, since operation of the machine tool 16 and/or the oil mist remover 20 is not changed, no determination result is sent to the command unit 40. That is, if the oil mist concentration is low, since the influence of the oil mist on the machine tool 16 is small, it is possible to proceed with the operation without changing the running state in the machining room 14 specially.

The command unit 40 is a functional unit for providing commands of the drive control for the machine tool 16 and the oil mist remover 20 based on the transmission of the high concentration determination made by the determination unit 38. In the first embodiment, firstly, the command unit 40 drives the oil mist remover 20. If oil mist concentration is still high even after driving the oil mist remover 20, the machining speed of the machine tool 16 is decreased, or operation of the machine tool 16 is stopped.

That is, even if the oil mist concentration in the machining room 14 is high, when the oil mist remover 20 is not in operation, it is possible to remove the oil mist by driving the oil mist remover 20. Therefore, by driving the oil mist remover 20 first, it is possible to suitably continue operating of the machine tool 16. The oil mist remover 20 may be driven beforehand. However, by stopping operation of the oil mist remover 20 (or operating the oil mist remover 20 in a power saving mode) until the determination unit 38 makes the high concentration determination, it is possible to reduce the running cost in the entire factory 12.

Alternatively, if the plurality of oil mist removers 20A to 20F are provided as in the case of this embodiment, only the oil mist remover 20 adjacent to the machine tool 16 that is in operation may be driven beforehand, and operation of the other oil mist removers 20 may be stopped. Further, in the case where the determination unit 38 has made the high concentration determination, by driving the other oil mist removers 20, it is possible to achieve reduction of the oil mist in the machining room 14.

In the case where the oil mist concentration is larger than the threshold value Th even after the elapse of a certain period of time from starting operation of the oil mist remover 20, it can be said that the oil mist concentration cannot be lowered easily only by operation of the oil mist remover 20. In this case, machining speed is decreased, or operation is stopped, in order from the machine tool 16 having the lower priority rank, among the plurality of machine tools 16A to 16F.

In this regard, when the machining speed of the machine tool 16 is decreased, since the cutting temperature thereof is lowered, it is possible to reduce the quantity of coolant (cooling medium) used for cooling the tools and/or workpieces. If the quantity of the coolant used is reduced, the quantity of the oil mist dispersed from the machine tool 16 is reduced, and as a result, it becomes possible to decrease the oil mist concentration.

For example, as shown in FIG. 3, the priority rank of the machine tool 16 should be determined based on the machining time (h) required for forming one workpiece, and the number (n) of orders received per month. That is, among the plurality of machine tools 16A to 16F, a machine tool 16 that machines a workpiece requiring a long machining time to complete or for which a large number of orders have been received needs to be operated for a long time period. In this case, if operation of such a machine tool is stopped easily, the production efficiency is lowered. Conversely, among the plurality of machine tools 16A, 16F, a machine tool 16 that machines a workpiece requiring a short machining time or for which a small number of orders have been received only needs to be operated for a short time period. In this case, even if operation of such a machine tool is stopped, the influence is relatively small. Therefore, by determining the priority rank using the information of the machining time and the number of orders received, for each of the plurality of machine tools 16A to 16F, and changing the operation content of the machine tools 16A to 16F in order from the machine tool 16 having the lower priority rank, it is possible to achieve reduction of the oil mist concentration (improvement of the working environment) while suppressing decrease in the running efficiency of the factory 12.

Hereinafter, a specific structure of the command unit 40 will be described. As shown in FIG. 2, a command content determination processing unit 42, a priority rank determination processing unit 44 (priority rank processing unit), a remover operation control unit 46, and a machine tool operation control unit 48 are built inside the command unit 40.

The command content determination processing unit 42 determines command contents for the plurality of machine tools 16A to 16F, and the plurality of oil mist removers 20A to 20F, based on reception of the high concentration determination. At the time of making the determination, the command content determination processing unit 42 receives information about the operation state of the oil mist remover 20 from the remover operation control unit 46, and initially determines whether the oil mist remover 20 is in operation or not. If the oil mist remover 20 is not in operation, or if the oil mist remover 20 is operated with a reduced removing power, the command content determination processing unit 42 determines that the oil mist remover 20 should be driven (e.g., at the maximum removing power), and operation of the remover operation control unit 46 is started.

Further, in the case where all of the plurality of oil mist removers 20A to 20F are in operation, change of operation content (decreasing of the machining speed, operation stop) of a certain machine tool 16 among the plurality of machine tools 16A to 16F is determined. Based on the determination, the priority rank determination processing unit 44 is operated.

The priority rank determination processing unit 44 calculates the priority rank of the plurality of machine tools 16A to 16F, and determines decreasing of the machining speed or operation stop in order from a machine tool 16 that has a lower priority rank. Calculation of the priority rank should be performed before starting control of the data processing apparatus 26. In this case, the priority rank determination processing unit 44 reads the machining time and the number of orders received for each of the machine tools 16 stored beforehand in the memory 32, to calculate the total machining time per month. The total machining time is obtained simply by multiplying the machining time by the number of orders received.

For example, as shown in FIG. 3, it is assumed that the machining times of the machine tools 16A to 16F (machine tools A to F) are 1, 2, 3, 4, 5, and 6, respectively, in the recited order. On the other hand, as for the number of orders received, it is assumed that the machine tool 16A has 150, the machine tool 16B has 50, the machine tool 16C has 100, the machine tool 16D has 5, the machine tool 16E has 15, and the machine tool 16F has 10. Thus, as for the total machining time, the machine tool 16A has 150 hours, the machine tool 16B has 100 hours, the machine tool 16C has 300 hours, the machine tool 16D has 20 hours, the machine tool 16E has 75 hours, and the machine tool 16F has 60 hours.

Then, the priority rank determination processing unit 44 assigns priority ranks to the calculated total machining times, in order from the longest total machining time. In the illustrated example, the machine tool 16C has the priority rank 1, the machine tool 16A has the priority rank 2, the machine tool 16B has the priority rank 3, the machine tool 16E has the priority rank 4, the machine tool 16F has the priority rank 5, and the machine tool 16D has the priority rank 6.

Then, when the high concentration determination is made by the determination unit 38, the priority rank determination processing unit 44 changes the operation contents of the machine tools 16A to 16F based on the priority ranks. In this case, the priority rank determination processing unit 44 determines to decrease the machining speed of the machine tool 16D having the lowest priority rank. Alternatively, the priority rank determination processing unit 44 may determine to stop operation of the machine tool 16D having the lowest priority rank. For example, the priority rank determination processing unit 44 compares the total machining time of the machine tool 16D with the total machining time of the machine tool 16F having the priority rank higher than the machine tool 16D by one. In the case where the difference between these values is a predetermined multiple or more, the priority rank determination processing unit 44 determines to stop operation of the machine tool 16D.

Further, in the case where the oil mist concentration does not become less than or equal to the threshold value Th even if the machining speed of the machine tool 16D is decreased, the priority rank determination processing unit 44 determines to decrease the machining speed of the machine tool 16F having the next lowest priority rank. Alternatively, in the case where the oil mist concentration does not become less than or equal to the threshold value Th, the priority rank determination processing unit 44 may determine to stop operation of the machine tool 16D. In the same manner, decreasing of the machining speed or operation stop is determined in order from the machine tool 16 having the lower priority rank until the oil mist concentration becomes less than or equal to the threshold value Th.

The remover operation control unit 46 controls operation of the plurality of oil mist removers 20A to 20F, and manages the operation states of the oil mist removers 20A to 20F individually. Likewise, the machine tool operation control unit 48 controls the operation states of the plurality of machine tools 16A to 16F, and manages the operation states of the machine tools 16A to 16F individually.

The oil mist management system 10 according to the first embodiment basically has the structure as described above. Hereinafter, effects and advantages of the oil mist management system 10 will be described.

At the time of running the factory 12, operations of the machine tools 16A to 16F and the oil mist concentration measuring apparatus 18 are started by the user, and machining is performed by suitable machine tools 16. Further, by starting operation of the oil mist concentration measuring apparatus 18, it becomes possible to measure the oil mist concentration. The oil mist management system 10 manages the oil mist in the machining room 14 by operating the data processing apparatus 26.

Figure 4:
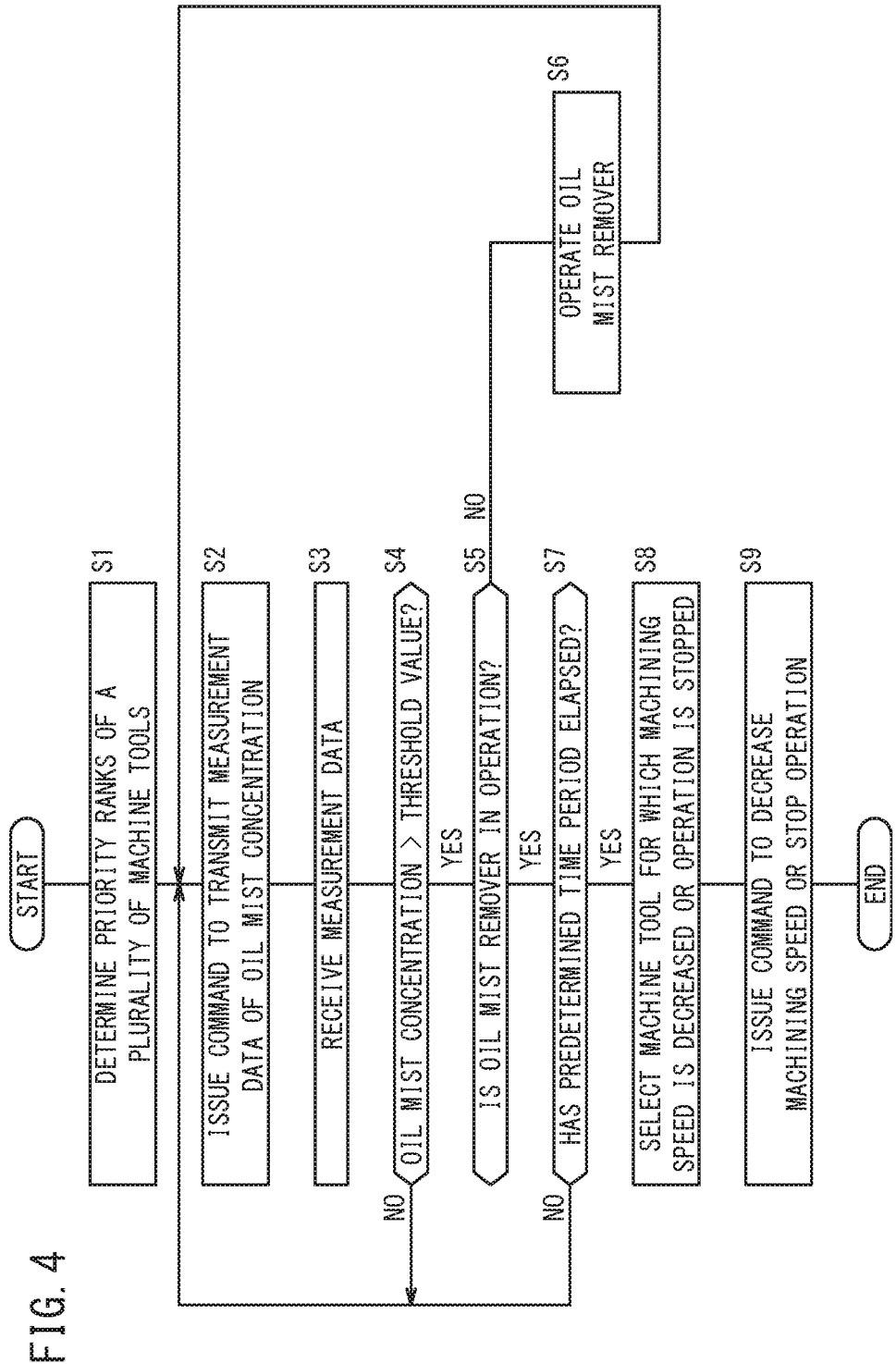
FIG. 4 is a flow chart showing a process flow of the data processing apparatus in FIG. 2.

As shown in FIG. 4, the data processing apparatus 26 determines the priority ranks of the plurality of machine tools 16A to 16F by the priority rank determination processing unit 44 after starting operation (step S1). This is because, by determining the priority ranks first, processing during the operation is simplified. As described above, the priority ranks of the machine tools 16 are determined based on the machining time and the number of orders received inputted by the user beforehand and stored in the memory 32.

Next, the oil mist concentration acquisition unit 34 outputs a transmission command of the measurement data Dm to the oil mist concentration measuring apparatus 18 at a predetermined cycle (step S2). Based on the command, the oil mist concentration measuring apparatus 18 measures the oil mist concentration, and outputs the measurement data Dm. Therefore, the oil mist concentration acquisition unit 34 receives the measurement data Dm (step S3: measurement data acquisition step), and stores the measurement data Dm as the oil mist concentration in the memory 32.

The determination unit 38 of the data processing apparatus 26 compares the received oil mist concentration with a threshold value Th which is retained in advance, and determines whether the oil mist concentration is larger than the threshold value Th (step S4: determination step). Then, in the case where the oil mist concentration is less than or equal to the threshold value Th, the routine returns to step S2. If the oil mist concentration is larger than the threshold value Th, the routine proceeds to step S5, and the process based on the high concentration determination is implemented by the command unit 40.

In step S5, the command content determination processing unit 42 of the command unit 40 receives management information from the remover operation control unit 46 to thereby determine whether or not all of the plurality of oil mist removers 20A to 20F are in operation. Then, in the case where the oil mist removers 20A to 20F are not in operation, operation of the oil mist remover 20 is determined, and the routine proceeds to step S6. In step S6, the oil mist remover 20 is operated by the remover operation control unit 46, and thereafter, the routine returns to step S2.

In the meanwhile, in the case where the oil mist removers 20A to 20F are in operation, the routine proceeds to step S7, in which it is determined whether or not a predetermined time period has elapsed from the time of starting operation of the oil mist remover 20 or from the time of starting decreasing of the machining speed or the time of stopping operation of the machine tool 16. Then, until the elapse of the predetermined time period, the routine returns to step S2, and measurement of the oil mist concentration and determination of the threshold value of the oil mist concentration are repeated.

In step S7, if it is determined that the predetermined time period has elapsed, the priority rank determination processing unit 44 refers to the priority ranks already determined by the priority rank determination processing unit 44, and selects a machine tool 16 that has the lowest priority and for which decreasing of the machining speed or operation stop is not implemented, from among the plurality of machine tools 16A to 16F (step S8). Then, the machine tool operation control unit 48 outputs a command to decrease the machining speed or stop operation of the machine tool 16 selected in step S8 (step S9: command step), and the machine tool 16 decreases its machining speed, or stops its operation.

By the above process, the data processing apparatus 26 finishes the process flow. In step S8, when the machine tool 16 is selected, notification to the effect that the selected machine tool 16 will decrease the machining speed or stop its operation should be made by the output device 28. Further, in the case where the machine tool 16 continues its machining operation, the data processing apparatus 26 should repeat the above process flow again.

As described above, the oil mist management system 10 according to the first embodiment can suitably recognize whether or not the oil mist concentration in the factory 12 has been increased based on the oil mist concentration measured by the oil mist concentration measuring apparatus 18 in the data processing apparatus 26. If the oil mist concentration is high, the data processing apparatus 26 changes the operation content (decreasing of the machining speed, operation stop, etc.) of the machine tool 16 to thereby decrease or eliminate the oil mist dispersed from the machine tool 16. In this manner, the desired working environment in the factory 12 is achieved, and improvement in the running efficiency of the factory 12, etc. is expected.

In this case, the data processing apparatus 26 can easily determine a machine tool 16 for which the machining speed should be decreased or operation should be stopped, based on the priority rank. Further, since the operation contents of the plurality of machine tools 16A to 16F are changed until the oil mist concentration becomes less than or equal to the threshold value Th, it is possible to decrease the oil mist in the factory 12 more reliably. Further, determination of the priority ranks is based on the total machining time. That is, if the total machining time is long, since there is no sufficient time for the machine tool 16 to machine the workpiece before the deadline, it is difficult to change the operation content. If the total machining time is short, since there is ample time for the machine tool 16 to machine the workpiece before the deadline, it is easy to change the operation content. Therefore, the oil mist management system 10 can suppress decrease in the running efficiency in the entire factory 12, and achieve reduction in the oil mist concentration.

Further, the oil mist management system 10 starts operation of the oil mist remover 20 before decreasing the machining speed or stopping operation of the machine tool 16. In this manner, it is possible to suppress easily changing of the operation content of the machine tool 16. Further, using the oil mist remover 20, it becomes possible to achieve reduction in the oil mist concentration.

The oil mist management system 10 according to the present invention is not limited to the above structure, and it is a matter of course that various applications and modifications can be adopted. For example, the oil mist management system 10 may utilize a plurality of oil mist concentration measuring apparatuses 18 in correspondence with the machine tools 16A to 16F to recognize the oil mist concentration around the machine tools 16A to 16F, and determines the priority ranks based on the oil mist concentration.

[Second Embodiment]

Figure 5:
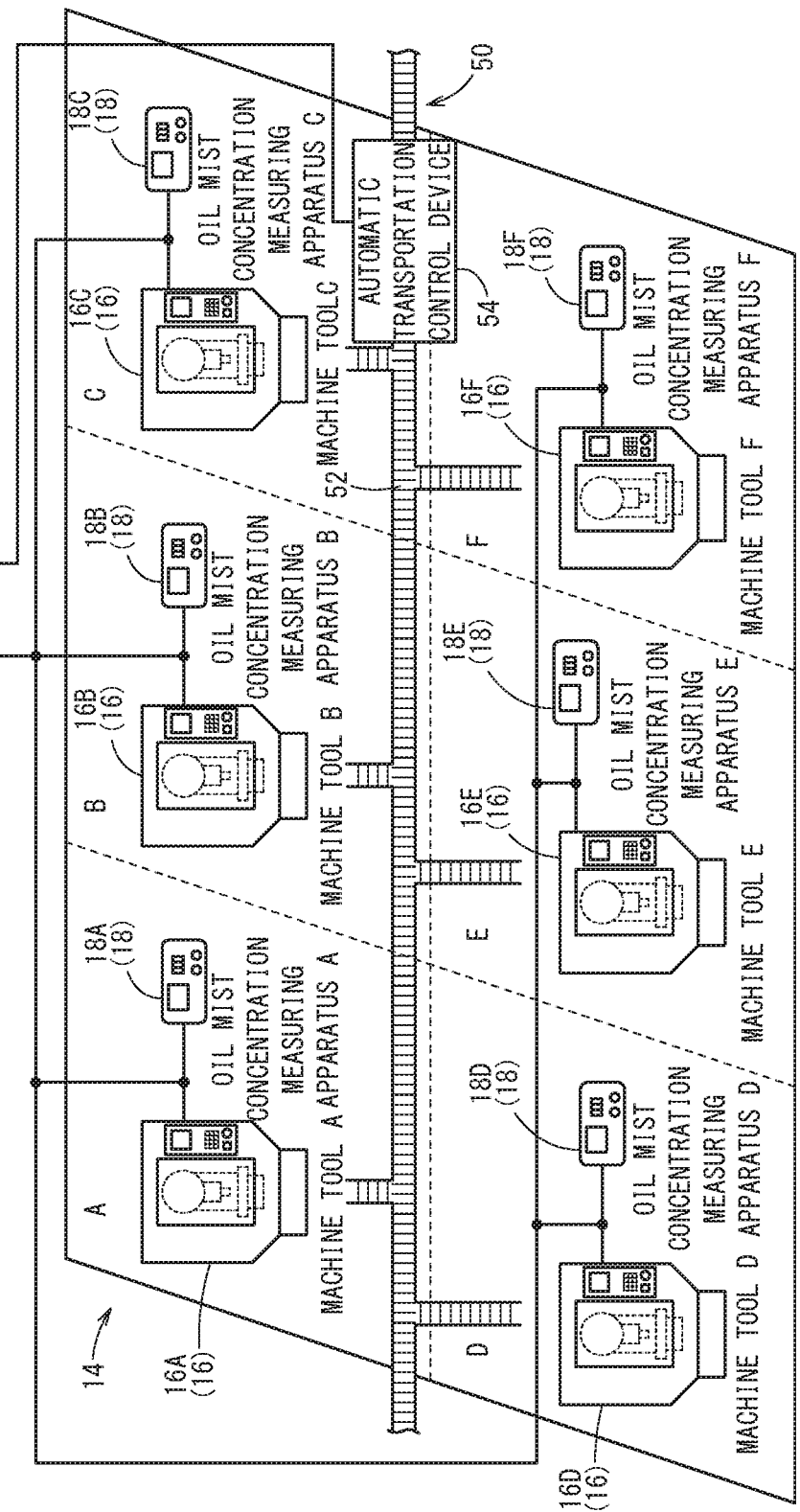
FIG. 5 is a diagram schematically showing overall structure of an oil mist management system according to a second embodiment of the present invention.

As shown in FIG. 5, an oil mist management system 10A according to a second embodiment is different from the oil mist management system 10 according to the first embodiment in that the machining room 14 is divided into a plurality of (six in FIG. 5) areas A to F, the oil mist in the areas is monitored, and machining is performed in an area that has a low oil mist concentration. In the following description, the constituent components having the same structure as those of the above described oil mist management system 10 are labeled with the same reference numerals, and the detailed description is omitted.

As a method of dividing the machining room 14 into the plurality of areas A to F, for example, the machining room 14 is divided into areas for each of the machine tools 16. Alternatively, in a case where the machining room 14 is partitioned by walls, resin panels, or the like into spaces, each of the partitioned spaces may be regarded as one area. Alternatively, even if the machining room 14 is not partitioned spatially, the machining room 14 may be virtually divided into the areas A to F which are rectangular (or square) areas having a predetermined size.

Each of the areas A to F is provided with one or more machine tool 16 and an oil mist concentration measuring apparatus 18. Hereinafter, each of the machine tools 16 and the oil mist concentration measuring apparatuses 18 provided in the areas A to F, may be described using the same alphabets as the areas A to F.

Further, in the factory 12, a data processing apparatus 26A and the output device 28 as in the case of the first embodiment are mutually connected. The data processing apparatus 26A performs information communication between the machine tools 16A to 16F and the oil mist concentration measuring apparatuses 18A to 18F in the areas A to F.

Further, a workpiece transportation apparatus 50 is provided in the machining room 14 according to the second embodiment. The workpiece transportation apparatus 50 automatically transports a workpiece to the machine tool 16A to 16F in each of the areas A to F. The workpiece transportation apparatus 50 includes a conveyor 52 for transporting the workpiece directly to the machine tool 16A to 16F in each of the areas A to F, and an automatic transportation control device 54 for implementing drive control of the conveyor 52.

Under the control of the automatic transportation control device 54, the conveyor 52 transports a workpiece to the machine tool 16 in a target area among the areas A to F. The workpiece transported by the conveyor 52 may be placed at a placement part of the machine tool 16 by a user, or may be placed automatically in the placement part of the machine tool 16 by a robot transportation apparatus (not shown), etc., of the workpiece transportation apparatus 50.

The automatic transportation control device 54 is connected to the data processing apparatus 26A for allowing communication of information between the automatic transportation control device 54 and the data processing apparatus 26A. Upon reception of a command from the data processing apparatus 26A, the automatic transportation control device 54 implements drive control of the conveyor 52. The mechanism for transporting the workpiece to the machine tool 16A to 16F in each of the areas A to F is not limited to the mechanism having the conveyor 52. Various apparatuses may be used for this purpose. For example, a robot, etc. having rotatably driven wheels for movement in the machining room 14 can be adopted. Alternatively, the oil mist management system 10A need not have the workpiece transportation apparatus 50, and a user who has confirmed the area by the output device 28 may transport the workpiece.

Figure 6:
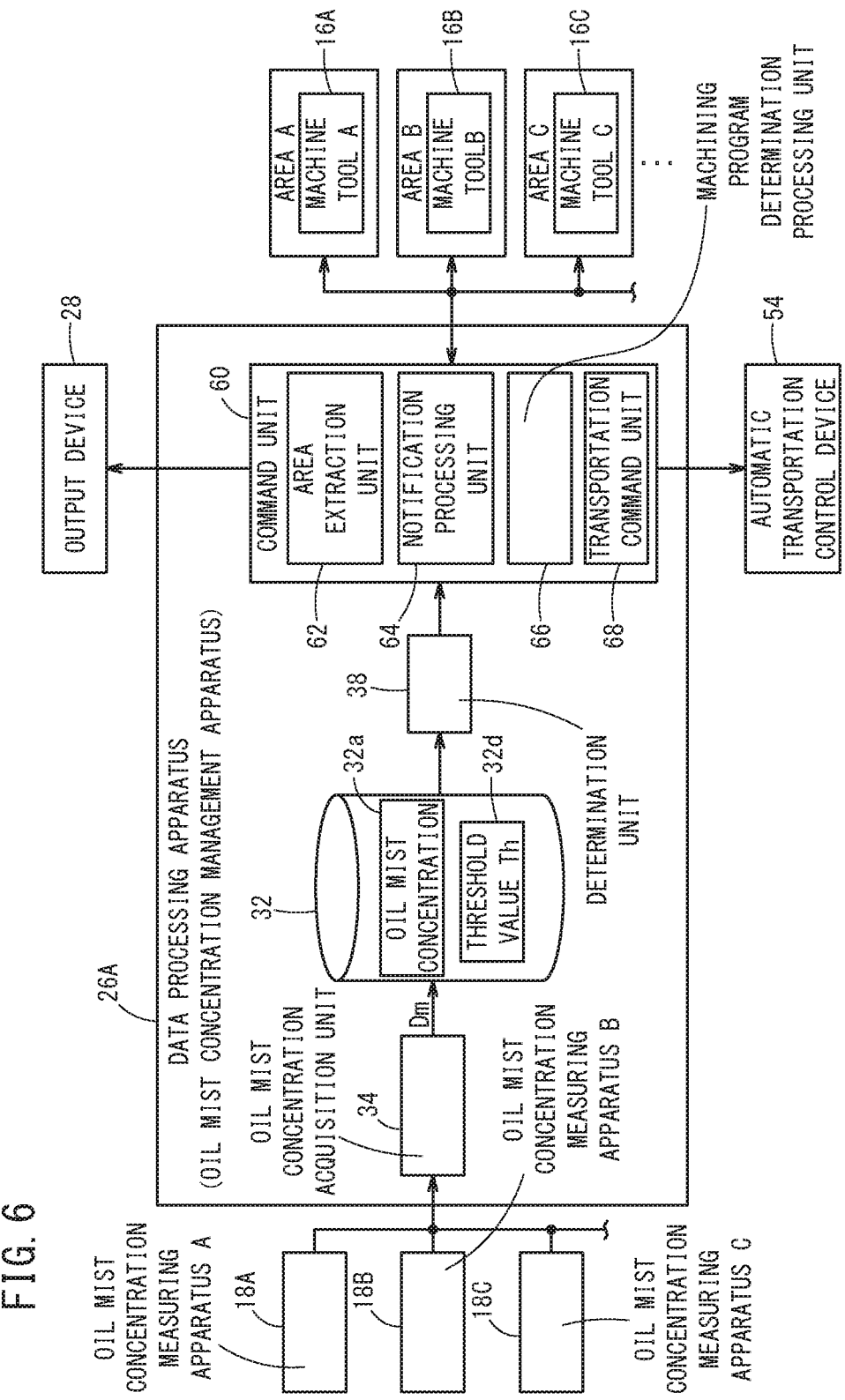
FIG. 6 is a functional block diagram at the time of operating the oil mist management system in FIG. 5.

The data processing apparatus 26A executes a control program (not shown) stored in the memory 32 by a processor to thereby build an oil mist concentration acquisition unit 34, a determination unit 38, and a command unit 60 as shown in FIG. 6.

The oil mist concentration acquisition unit 34 basically has the same function as that of the first embodiment. The oil mist concentration acquisition unit 34 receives the oil mist concentration from the oil mist concentration measuring apparatuses 18A to 18F in the areas A to F. Then, a database is created in a manner to associate the areas A to F with the oil mist concentration, and store the data in an oil mist concentration storage area 32a of the memory 32.

Further, the determination unit 38 basically has the same function as that of the first embodiment as well. In this embodiment, the determination unit 38 compares the oil mist concentration measured in each of the areas A to F with a threshold value Th. Then, the determination unit 38 determines whether or not the oil mist concentration is larger than the threshold value Th for each area, and if the oil mist concentration is larger than the threshold value Th, the determination unit 38 instructs the command unit 60 to perform the process based on the high concentration determination.

The command unit 60 recognizes the degree of the oil mist concentration on an area-by-area basis, and prompts machining of the workpiece by a machine tool 16 in the area having the low oil mist concentration, instead of the area where the high concentration determination was made. Further, in the case where the machine tool 16 of an area to which the workpiece is transported does not have any machining program, the command unit 60 can transmit the machining program to the machine tool 16 of the area.

Further, the command unit 60 commands the workpiece transportation apparatus 50 to automatically transport the workpiece to the target area.

Specifically, the command unit 60 builds therein an area extraction unit 62, a notification processing unit 64, a machining program determination processing unit 66, and a transportation command unit 68.

The area extraction unit 62 reads the oil mist concentration of each of the areas A to F stored in the memory 32 to recognize the relative difference in the oil mist concentration on the area-by-area basis (e.g., determination of ranking, etc.). Further, at this time, the area extraction unit 62 obtains the running state from each of the machine tools 16A to 16F, and recognizes the machine tool 16 that is not machining workpieces.

Then, the area extraction unit 62 extracts an area where machining of the workpiece is not performed (machine tool 16 is not in operation) and the oil mist concentration is the lowest, to handle the area where the high concentration determination has been made by the determination unit 38. If there are a plurality of areas where the high concentration determination has been made, the area extraction unit 62 extracts the areas in order from the area having the lower oil mist concentration. Alternatively, the area extraction unit 62 may simply extract the area where the machine tool 16 is not in operation, regardless of the oil mist concentration of the area. This is because, since it is assumed that the oil mist concentration is low in an area where the machine tool 16 is not in operation, by switching to this machine tool 16 for machining, it is possible to achieve a uniform distribution of oil mist concentration in the factory 12.

The notification processing unit 64 outputs output information to the output device 28 for switching the machining area for the workpiece from the area where the high concentration determination has been made, to the area extracted by the area extraction unit 62. In this manner, the user who is provided with information from the output device 28 can recognize the switching of the areas.

The machining program determination processing unit 66 detects whether or not the machine tool 16 of the area extracted by the area extraction unit 62 has the machining program used by the machine tool 16 in the area where the high concentration determination has been made. Then, in the case where the machine tool 16 in the extracted area does not have the machining program, the machining program determination processing unit 66 transmits the machining program to the machine tool 16 in the extracted area.

The transportation command unit 68 commands the above described automatic transportation control device 54 to transport the workpiece to the machine tool 16 in the extracted area. In this manner, the workpiece can be automatically transported to the machine tool 16 in the extracted area.

The oil mist management system 10A according to the second embodiment basically has the above structure. Hereinafter, effects and advantages of the oil mist management system 10A will be described.

Figure 7:
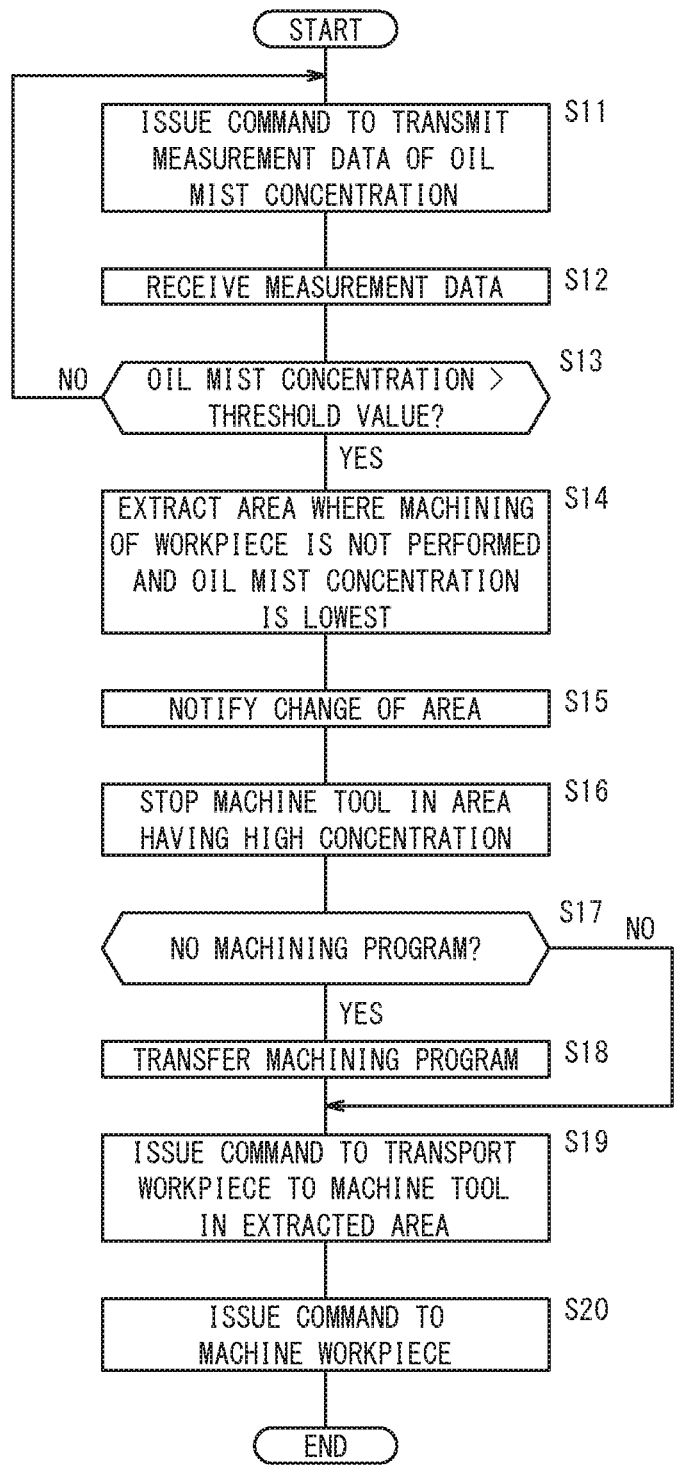
FIG. 7 is a flow chart showing a process flow of a data processing apparatus in FIG. 5.

As shown in FIG. 7, when operation of the data processing apparatus 26A is started, the oil mist concentration acquisition unit 34 outputs a transmission command of the measurement data Dm at every predetermined timing, to the oil mist concentration measuring apparatus 18A to 18F in each of the areas A to F (step S11). Then, the oil mist concentration acquisition unit 34 receives the measurement data Dm from the oil mist concentration measuring apparatuses 18A to 18F (step S12: measurement data acquisition step), and stores the measurement data Dm in the memory 32 as oil mist concentration.

The determination unit 38 compares the received oil mist concentration with a threshold value Th which is retained beforehand, and determines whether or not the oil mist concentration is larger than the threshold value Th on the area-by-area basis (step S13: determination step). Then, in the case where the oil mist concentration is less than or equal to the threshold value Th, the routine returns to step S11. If the oil mist concentration in an area is larger than the threshold value Th, the routine proceeds to step S14, and the command unit 60 implements the process based on the high concentration determination.

In step S14, the area extraction unit 62 of the command unit 60 extracts an area where machining of the workpieces is not performed and the oil mist concentration is the lowest. When the extracted area is determined, the notification processing unit 64 notifies the change of the area where machining of the workpiece is performed (i.e., to the effect that the machine tool 16 to be operated is changed) through the output device 28 (step S15).

After notification, operation of the machine tool 16 of the area where the oil mist concentration has exceeded the threshold Th is stopped (step S16). At this time, if the workpiece is in the middle of being machined, operation of the machine tool 16 should be stopped after finishing machining of the workpiece.

Further, the machining program determination processing unit 66 determines whether or not the machine tool 16 in the extracted area has the machining program of the machine tool 16 in the area where the high concentration determination has been made (step S17). In this determination, if it is determined that the machine tool 16 of the extracted area does not have the machining program, in step S18, the machining program determination processing unit 66 performs a process of transmitting the machining program to the machine tool 16 of the extracted area. If it is determined that the machine tool 16 of the extracted area has the machining program, step S18 is skipped, and the routine proceeds to step S19.

Next, the transportation command unit 68 outputs a command to the automatic transportation control device 54 to transport the workpiece to the machine tool 16 of the extracted area (step S19). Thus, the workpiece transportation apparatus 50 automatically transports the workpiece to the machine tool 16 in the extracted area. Then, the data processing apparatus 26A commands the machine tool 16 to machine the workpiece in the extracted area, i.e., in the area where oil mist concentration is low in the machining room 14 (step S20: command step).

After the above process, the process flow of the data processing apparatus 26A is finished. Further, in the case where the machine tools 16 continue the machining operation, the data processing apparatus 26A repeats the above process flow again. Thus, in the case where the oil mist concentration of the area where machining is newly started is increased, in the area where high concentration determination was made, but thereafter the oil mist concentration was decreased, it becomes possible to resume machining.

As described above, in the oil mist management system 10A according to the second embodiment, the data processing apparatus 26A recognizes the state of oil mist concentration distribution on the area-by-area basis. In this manner, it is possible to stop machining of the machine tool 16 in the area where the oil mist concentration is high. Further, the oil mist management system 10A commands the machine tool 16 in the area where the machine tool 16 is not in operation and the oil mist concentration is the lowest, to machine the workpiece. In this manner, it is possible to achieve the uniform oil mist concentration distribution in the factory 12 more efficiently.

Further, in the case where the machine tool 16 does not have the machining program, the oil mist management system 10A transmits the machining program to the machine tool 16. In this manner, the machine tool 16 can perform machining of the workpiece desirably. Further, in the oil mist management system 10A, the workpiece transportation apparatus 50 transfers the workpiece to the machine tool 16 which is commanded to machine the workpiece. In this manner, it is possible to perform machining of the workpiece more efficiently. Further, the oil mist management system 10A notifies the user of the machine tool 16 for which operation content is changed, and the operation content (change of the machine tools 16, decreasing of the machining speed, or operation stop, etc.), by the output device 28. In this manner, the user can recognize the management in operation of the machine tool 16 in the factory 12 suitably.

The present invention is not limited to the above described embodiments. It is a matter of course that various modifications can be made without deviating from the scope of the present invention.

What is claimed is:

1. An oil mist concentration management apparatus, comprising:
   a processor configured to
      acquire concentration of oil mist measured in a factory in which a plurality of machines are provided,
      determine whether or not the concentration of the oil mist is larger than a threshold value, and
      if the concentration of the oil mist is determined to be larger than the threshold value, issue a command to change operation content of at least one of the plurality of machines,
      wherein the processor is configured to issue a command to decrease machining speed of the machine or stop operation of the machine as the operation content,
      wherein the processor is configured to determine priority ranks of the plurality of machines, and
      wherein, in a case where the concentration of the oil mist is larger than the threshold value, the processor is configured to issue a command to decrease the machining speed or stop the operation, in order from the machine having lower priority rank, until the concentration of the oil mist becomes less than or equal to the threshold value.

2. The oil mist concentration management apparatus according to claim 1, wherein the processor is configured to
   calculate total machining time based on a machining time required for the machine to machine a workpiece, and number of orders received for the workpiece, and
   assign the priority ranks to the machines in order from the machine having a longer total machining time.

3. The oil mist concentration management apparatus according to claim 1, wherein, in the case where the concentration of the oil mist is larger than the threshold value, the processor is configured to issue a command to operate an oil mist remover provided beforehand in the factory before issuing the command to decrease the machining speed or stop operation of the machine, the oil mist remover being configured to remove the oil mist.

4. The oil mist concentration management apparatus according to claim 1, further comprising a notification processing unit, wherein, when a machine for which the operation content is changed is determined by the processor, the notification processing unit is configured to notify a user of the machine for which the operation content is changed, and the operation content.

5. An oil mist concentration management apparatus, comprising:
a processor configured to
  acquire concentration of oil mist measured in a factory in which a plurality of machines are provided;
  determine whether or not the concentration of the oil mist is larger than a threshold value; and
  if the concentration of the oil mist is determined to be larger than the threshold value, issue a command to change operation content of at least one of the plurality of machines, wherein
  the processor is configured to manage state of the oil mist in a plurality of areas where the plurality of machines are provided respectively, on an area-by-area basis, and
  if the concentration of the oil mist is larger than the threshold value in a certain area, the processor is configured to command a machine of the machines that is in an area where the machine is not operated, to perform machining, as the operation content.

6. The oil mist concentration management apparatus according to claim 5, wherein, in a case where the concentration of the oil mist is larger than the threshold value in a certain area, the processor is configured to command a machine of the machines that is in an area where the concentration of the oil mist is lowest, to perform machining.

7. The oil mist concentration management apparatus according to claim 5, wherein the processor is configured to
  determine whether or not the machine to be commanded to perform machining has a machining program, and
  if the machine to be commanded to perform the machining does not have the machining program,
    transmit the machining program to the machine to be commanded to perform the machining.

8. The oil mist concentration management apparatus according to claim 5, further comprising:
  a workpiece transportation apparatus configured to automatically transport a workpiece to the plurality of areas,
  wherein the processor is configured to command the workpiece transportation apparatus to transport the workpiece to an area of the machine to be commanded to perform the machining.

9. An oil mist management system, comprising:
a plurality of machines provided in a factory;
a concentration measuring apparatus configured to measure concentration of oil mist in the factory; and
an oil mist concentration management apparatus configured to determine whether or not the concentration of the oil mist is larger than a threshold value,
wherein if the concentration of the oil mist is determined to be larger than the threshold value, the oil mist concentration management apparatus is configured to issue a command to change operation content of at least one of the plurality of machines,
wherein the oil mist concentration management apparatus issues a command to decrease machining speed of the machine or stop operation of the machine as the operation content,
wherein the oil mist concentration management apparatus is configured to determine priority ranks of the plurality of machines, and
wherein, in a case where the concentration of the oil mist is larger than the threshold value, the oil mist concentration management apparatus is configured to issue a command to decrease the machining speed or stop the operation, in order from the machine having lower priority rank, until the concentration of the oil mist becomes less than or equal to the threshold value.

10. An oil mist management method of managing, by an oil mist concentration management apparatus, oil mist in a factory where a plurality of machines are provided, the method comprising:
  a measurement data acquisition step of acquiring concentration of the oil mist in the factory;
  a determination step of determining whether or not the acquired concentration of the oil mist is larger than a threshold value; and
  a command step of, in a case where it is determined that the concentration of the oil mist is larger than the threshold value in the determination step, issuing a command to change operation content of at least one of the plurality of machines,
wherein
the oil mist management method manages state of the oil mist in a plurality of areas where the plurality of machines are provided respectively, on an area-by-area basis, and
if the concentration of the oil mist is larger than the threshold value in a certain area, the command step comprises commanding a machine of the machines that is in an area where the machine is not operated, to perform machining, as the operation content.

* * * * *